United States Patent
Gudka et al.

(10) Patent No.: US 10,866,872 B1
(45) Date of Patent: Dec. 15, 2020

(54) AUTO-RECOVERY FOR SOFTWARE SYSTEMS

(71) Applicant: Capital One Services, LLC, McLean, VA (US)

(72) Inventors: Bhavik Gudka, Glen Allen, VA (US); Milind Patel, Frisco, TX (US); Surya Avirneni, Plano, TX (US); Umang Mistry, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/687,252

(22) Filed: Nov. 18, 2019

(51) Int. Cl.
| | |
|---|---|
| *G06F 9/44* | (2018.01) |
| *G06F 11/30* | (2006.01) |
| *G06F 11/32* | (2006.01) |
| *G06F 11/07* | (2006.01) |
| *G06F 11/36* | (2006.01) |

(52) U.S. Cl.
CPC ........ *G06F 11/302* (2013.01); *G06F 11/0772* (2013.01); *G06F 11/0793* (2013.01); *G06F 11/323* (2013.01); *G06F 11/362* (2013.01); *G06F 11/3664* (2013.01)

(58) Field of Classification Search
CPC .......................... G06F 11/079; G06F 11/0751
See application file for complete search history.

(56) References Cited

U.S. PATENT DOCUMENTS

| | | |
|---|---|---|
| 7,263,632 B2 | 8/2007 | Ritz et al. |
| 7,606,165 B2 | 10/2009 | Qiu et al. |
| 8,484,288 B2 | 7/2013 | Lakshmanan et al. |
| 8,533,608 B1 * | 9/2013 | Tantiprasut ............ G06Q 10/06 715/751 |
| 8,756,301 B2 | 6/2014 | Ennis |
| 8,819,131 B2 | 8/2014 | Hebert et al. |
| 9,015,301 B2 | 4/2015 | Redlich et al. |
| 9,195,971 B2 | 11/2015 | McConnell et al. |
| 9,454,294 B2 | 9/2016 | Sapuram et al. |
| 9,525,696 B2 | 12/2016 | Kapoor et al. |
| 9,578,073 B2 | 2/2017 | Bader-Natal et al. |
| 9,799,004 B2 | 10/2017 | Buford et al. |
| 9,876,827 B2 | 1/2018 | Chew et al. |
| 9,891,971 B1 * | 2/2018 | Kuhhirte ............. G06F 11/0709 |

(Continued)

OTHER PUBLICATIONS

Extended Search Report for European Application No. 19206612.4 dated Apr. 17, 2020, 11 pages.

(Continued)

*Primary Examiner* — Duy Khuong T Nguyen

(57) ABSTRACT

Disclosed are hardware and techniques for building runbooks for new computer-implemented processes by correlating break events from the new processes with break events extant in existing runbooks for existing computer-implemented processes. In addition, fix events associated with the correlated break events are evaluated to determine the likelihood that they will be able to fix the error condition which caused the break event from the new process. The fix events are presented to a human operator who may select and test each fix event to determine if the error condition is directed and, if so, the correlated break event associated with the fix event are merged together and added to a new runbook for the new computer-implement process.

19 Claims, 7 Drawing Sheets

(56) References Cited

U.S. PATENT DOCUMENTS

| | | | |
|---|---|---|---|
| 10,162,698 B2 | 12/2018 | Mah et al. | |
| 10,169,133 B2 | 1/2019 | Golash et al. | |
| 10,210,115 B2 | 2/2019 | MacKenzie et al. | |
| 10,275,331 B1* | 4/2019 | Gudka | G06F 11/3457 |
| 10,282,248 B1 | 5/2019 | Gudka et al. | |
| 10,310,723 B2 | 6/2019 | Rathod | |
| 10,412,210 B2 | 9/2019 | Bjontegard | |
| 10,429,825 B2 | 10/2019 | Sait et al. | |
| 10,484,480 B2 | 11/2019 | Calcaterra et al. | |
| 10,671,263 B2* | 6/2020 | King | G06F 3/04847 |
| 10,769,043 B2 | 9/2020 | Sabharwal et al. | |
| 2004/0225381 A1 | 11/2004 | Ritz et al. | |
| 2005/0171752 A1 | 8/2005 | Patrizio et al. | |
| 2008/0126829 A1 | 5/2008 | Roberston et al. | |
| 2008/0262890 A1 | 10/2008 | Korupolu et al. | |
| 2012/0303772 A1* | 11/2012 | Ennis | G06N 5/02 709/223 |
| 2014/0067702 A1 | 3/2014 | Rathod | |
| 2014/0222916 A1 | 8/2014 | Foley et al. | |
| 2014/0245173 A1 | 8/2014 | Knodt et al. | |
| 2015/0127628 A1 | 5/2015 | Rathod | |
| 2015/0127979 A1* | 5/2015 | Doppalapudi | G06F 11/0709 714/15 |
| 2016/0036718 A1 | 2/2016 | Shingari et al. | |
| 2016/0065627 A1 | 3/2016 | Pearl et al. | |
| 2016/0255139 A1 | 9/2016 | Rathod | |
| 2016/0266962 A1 | 9/2016 | Rajasekharan et al. | |
| 2016/0337435 A1 | 11/2016 | Nigam et al. | |
| 2017/0249644 A1 | 8/2017 | DiMaggio et al. | |
| 2018/0091528 A1* | 3/2018 | Shahbaz | H04L 63/1416 |
| 2019/0058638 A1 | 2/2019 | Ahuja et al. | |
| 2019/0097909 A1 | 3/2019 | Puri et al. | |
| 2019/0121498 A1 | 4/2019 | Jakobovits et al. | |
| 2019/0155870 A1 | 5/2019 | Prakash et al. | |
| 2019/0207818 A1 | 7/2019 | Niestemski et al. | |
| 2019/0245767 A1 | 8/2019 | Di Girolamo et al. | |
| 2020/0004618 A1* | 1/2020 | Thornhill | G06F 16/907 |
| 2020/0042370 A1 | 2/2020 | Kao et al. | |
| 2020/0092334 A1 | 3/2020 | Hiebert et al. | |
| 2020/0167254 A1 | 5/2020 | Gudka et al. | |
| 2020/0175439 A1 | 6/2020 | Abu El Ata et al. | |

OTHER PUBLICATIONS

Extended Search Report for European Application No. 19206630.6 dated Apr. 24, 2020, 10 pages.

* cited by examiner

*600*

```
Receive An Alert Associated With A Break Event Of A Computer-Implemented
Process
602
                            │
                            ▼
Access The Runbook For The Computer-Implemented Process
604
                            │
                            ▼
Determine That The Runbook Contains An Automated Fix Event For The Break
Event
606
                            │
                            ▼
Execute The Automated Fix Event
608
```

FIG. 6

AUTO-RECOVERY FOR SOFTWARE SYSTEMS

BACKGROUND

Current state of technology remediation is that, when computer process, computer hardware or software breaks, people gather resources and execute fail safes and contingency plans to recover the broken technology (i.e., the broken computer process, computer hardware or software). Workarounds and typical break-fix activities are the mainstays of technology remediation and make up the best practices for how to recover technological services when something goes awry. The aim of these recovery plans is address three metrics commonly used to indicate the efficacy of a technology remediation system: mean time to detect (MTTD); mean time to repair (MTTR); and mean time between failures (MTBF). An effective technology remediation system implements processes that reduce MTTD and MTTR, while increasing the MTBF.

There are several commercial systems with offerings, such as Zabbix that allow a computer system "break-fix" to be paired with a "Response." These commercial offerings, however, tend to require specific break events to trigger a single response. The evolution of technology services (e.g., computer systems that implement services and applications) means that the technological environments, technology, and their frameworks are becoming increasingly complex. Moreover, the identification of any single "root causing break event" may be complicated by cloud-based services such as Amazon web services (AWS), Microsoft Azure, Oracle Cloud, Apache Hadoop, or Google Cloud platform, cross-connections with physical hardware-based networks, and the many development frameworks and different coding languages that make up even simple applications. Presently, the determination of where a root-cause source of a technology problem is substantially an all-human experience-driven, and humans are slow providers of "production system support" and "incident triage."

As a result, different types of production system support methodologies have been implemented to compensate for the human shortfalls. Across tech organizations, production system support functions use manually-generated and manually-maintained document libraries, called "runbooks", that are used to identify a problem via integrated monitoring and deploy a fix. These production system support functions are siloed to specific applications that have such documentation.

For example, one production system support process may be termed "Fix on the go." In a fix on the go process, engineers may make weekly/monthly rotations to support issues for 24 hours, 7 days a week. In response to detection of an application-specific issue, a support team member pages one of the engineers in the "on call" group. The engineer on call will access via a graphical user interface an incident bridge that lists issues, attempt to understand the issue and implement a fix using an emergency change process. This is a slow labor-intensive process and does not help reduce MTTR.

Another production support process utilizes document-based (where a "document" can be an actual document, on online file, help system or some other reference source) operational runbooks that a development team/support team has developed which documents steps to fix known/recurring issues. The document operational runbooks save some time but are not a significant improvement as an engineer needs to understand the procedure during an issue and implement the steps of fixing the known/recurring issues. There is always a chance of human error with either the understanding of the procedure or the implementation of the steps fixing the known/recurring issues. Related production support processes that automate the runbook (keep the scripts on some server/repo) offer slight improvement, but these processes still rely on a human to find a cause and trigger a fix from the corresponding runbook.

Some automated systems rely heavily on operator expertise to correctly identify the problem and its solution, and to deploy it as quickly as possible. When expertise, understanding of the broken system, and/or ability execute the fix are lacking, the brokenness escalates throughout a computing system and begins to impact upstream and downstream systems as well. This chain of up and downstream systems is called "interdependency."

Time is of the essence in nearly all remediation instances, but without proper resources, technology systems are subjected to lengthy and investigative triage. The fix is typically done in a silo of the impacted system first, which places the interdependencies at risk of ongoing impact and delay in restoration of service. This siloed focus on a single break event complicates root cause in the interdependent system chain and can lead to false positives where any single failure is fixed, but a root cause remains unaddressed in a systemically broken set of technology services.

The evolution of cloud-based services further complicates the technology remediation solutions as a common solution is to continually create new instances (where an instance can be the cloud equivalent to any application or network service entity) and destroy the older instances of the less robust services or applications before an issue arises "just in case."

Interdependent systems further complicate break-fix stability. As system complexity increases, the definition of "working" and "broken" get blurred as does the visibility of past break-fix events as they correlate to any present events. The interdependency of systems further reduces an engineer's ability to completely understand the effects of a fix to one system on another system when the applied fix affects multiple processes of the other system.

When bringing a new system online, no runbook may exist for the system. The process for creating a runbook can be cumbersome and time-consuming, relying on trial- and error fixes to address issues that arise when the software system is running. The fixes specified in a runbook may include scripts that, when executed, fix the problem or at least allow the system to continue to provide its intended functionality until a human operator can address the issue. However, even after a runbook is developed, human intervention may still be required to identify an issue, consult the runbook to identify an appropriate response and trigger the response.

It would therefore be beneficial to provide a system and process that aids in the development of a runbook for a new software system. Further, it would be highly desirable for the system to use the runbook to provide automated responses to break events, without the need for human intervention.

SUMMARY

Runbooks for new processes are created by correlating break events generated by the new process with existing break events for other, similar processes having automated fixes (i.e., fix events) corresponding to matching or highly-correlated break events. To create a runbook that may be effectively automated, it is first necessary that the software process for which runbook is being created employ a monitoring system that provides detailed, effective alerts when break events occur. An effective alert will specify what in the software process is not running as intended (i.e. the break event), why the break event occurred, the real-world impact of the break event, etc. In general, the more information contained in the alert, the higher the likelihood that a similar, highly-correlated break event for a similar, existing process will be found in an existing runbook, and the higher probability that the fix event corresponding to the break events for the existing process will work for the new process when the alert is generated.

Disclosed is an example of one embodiment of the invention comprising a system including a non-transitory, computer-readable medium storing instructions that, when executed, cause the system to add automated fix events to a runbook for a new computer-implemented process. An alert is received from the new computer-implemented process by the system. The alert may be generated by a monitoring system running in real-time on the new process or may be generated by simulation of the new process performed by an operator. Preferably, the alert will be associated with a break event that cause the alert, which specifies at least a component of the new process or other aspects of the new process which is not operating as intended, the reason that the component is not operating as intended, and the real-world effect of the break event. Once the alert has been received, one or more runbooks of one or more existing computer-implemented processes may be accessed.

The existing runbooks contain associated alerts, break events and automated fix events. Automated fix events may be in the form of, for example, software snippets or scripts that may be executed to fix the error condition which caused the break event or to, at least, keep the new process running until the cause of the error condition and a potential fix may be identified by human operator. The existing runbooks may be accessed to identify one or more break events having a high level of correlation with the break events that cause the arts to be received from the new process. Generally, runbooks from existing processes similar to the new process are likely to have a higher probability of having highly-correlated break events and automated fix events that will work with the new process. Existing processes similar to the new process may be identified as processes having functions similar to the functions of the new process, or processes having other factors in common with the new process, for example, interfacing with the same systems or accessing the same resources.

Once existing runbooks have been identified containing one or more break events determined to be highly-correlated with the break event generated by the new process, a human operator may be presented with an option of one or more possible fix events associated with the highly-correlated break events that are likely to address the error condition from the new process. The identified fix events may be presented to the user in a menu-like fashion such that the user may select one or more of the fix events. The fix events may be ranked in the menu in accordance with the probability that the fix events will fix the error condition that cause the break event identified in the alert from the new process.

The human operator may select one of the fix events and execute the selected fix event to determine if the fix event effectively addresses the error condition which caused the break event to occur in the new process. If the error condition in the new process is successfully addressed by the selected fix event, selected fix event may be added to a runbook for the new process and associated in the runbook for the new process with the break event that cause the alert to be received from the new process. In the event that the selected fix event does not address the problem which caused the break event, the human operator may select another fix event from the menu and may repeat this process until a fix event is found that effectively addresses the error condition.

In a second embodiment of the system, correlated break events not associated with an automated fix event may be discovered in runbooks from similar processes or, alternatively, no correlated break events may be discovered in runbooks from similar processes. When this occurs, the human operator is able to provide an automated fix event which, if it effectively addresses the problem causing the alert, may be added to the runbook associated with the new process.

In yet another embodiment of the invention, a method is disclosed for using the runbook associated with the new process. When an alert is received from the new process, the runbook associated with the process is accessed. It is determined that the runbook comprises an automated fix event associated with the break event specified in the alert and, if so, the automated fix event is executed. Before the automated fix event is implemented, a user control to confirm execution of the automated fix event may be presented to the human operator and a positive response may be required from the human operator before executing the automated fix event.

BRIEF DESCRIPTION OF THE DRAWINGS

FIG. 6 illustrates a process flow for using a runbook created by the processes of FIGS. 4 and 5 for a new process.

DETAILED DESCRIPTION

Figure 1:
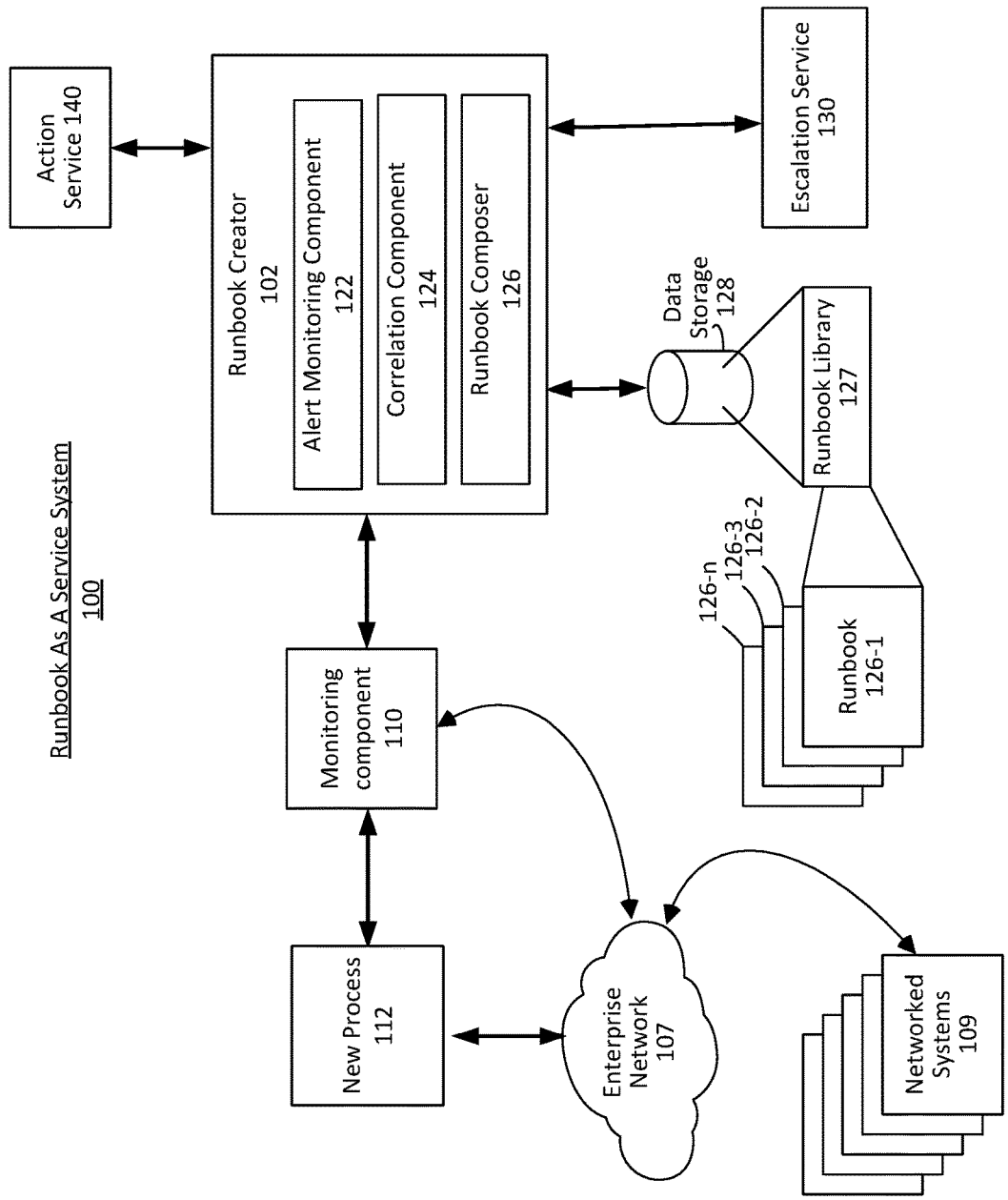
FIG. 1 illustrates an exemplar network environment suitable for creating a runbook for a new process.

The structure of a runbook is, in its simplest form, a document containing operator instructions for maintaining a technology system. The runbook will contain a description about the application/system, the up and downstream dependencies of the system (i.e., interfaces with other systems), an architecture diagram with end points clearly notated, detailed notes about how and what languages and versions it is built in and permissions needed to access these end points and systems. In addition, one or more monitoring systems used to monitor the system and generate alerts are described with a complete list of the error conditions, break events and fix events that create the alerts.

The error conditions, if the alert is not investigated and resolved, may become break events. The runbook explains how long an error condition may be allowed to continue before a break event occurs. For example, if a system is down more than 15 min, that alone may make the outage critical. For other systems, criticality may be defined by a combination of time, the number of users impacted and the effect on revenue. Other criteria may be used but these criteria appear to represent a best practice for production support. Visualization mechanisms, for example, a dashboard showing the overall health of a system, may be included in a runbook.

Because system builders and designers are often different from the team that supports the system, the entries in the runbook may often contain step-by-step instructions for what to do to fix the system when an alert is generated. Example: Alert "ABC123" triggers when traffic to the home page of an organization drops to either 0 or by 80% of normalized 60 day traffic for a 1 hour time period. The most likely cause of this error is a failure of a switch requiring a reboot. Instructions may be given as to where to go to obtain the status of the switch. The runbook may contain reboot instructions for the switch or a link to instructions or may contain an automated code snippet or script that will fix the error condition (i.e., a fix events). For example, the reboot process for the switch may be automatable, in which case the fix event may be executed automatically or based on a user confirmation. Runbooks may also contain code snippets or scripts that can be copy and pasted by a human operator.

It may be helpful to explain frequently used terminology, such as break event and fix event. As an example, a break event may be output by a monitoring system as an indication of nearly anything that goes awry with a process, such as a failure to connect to a service, failure to receive an input within a prescribed time or after multiple requests, regularly exceeding time limits for completing tasks, memory allocation errors or limit problems or the like. In contrast to a break event, a fix event is an indication, a flag or even an address of corrective action that will correct a process experiencing a break event, or fix the cause of the break event, multiple unrelated break events (e.g., restart system) or multiple related break events.

Various embodiments of this invention are generally directed to techniques to evaluate a new computer process in a network environment for which no runbook currently exists, and to automate the creation of a runbook for the new process. The new process may be run in a simulated or production environment to determine alerts triggered by error conditions and leading to break events. The alerts may be generated by one or more monitoring systems. Preferably, a break event causing the alerts may be correlated with break events from other, similar systems or processes. Optimally, fix events in runbooks for other, similar systems may be used to fix the error condition occurring in the new process. When such fix events are identified, they are added to a runbook for the new process. Preferably, the fix events may be automated such that, in production, the events may be triggered by the alert and automatically executed to fix the error condition which causes the alert or, at least, keeps the process running at an acceptable level until human intervention may be applied.

In various embodiments, potential fix events that may be used to address the error condition may be identified by correlating the break event causing an alert to be received from the new process with break events contained in runbooks from existing processes. A human operator does early correlation across runbooks. However, once similarity between systems is established, fix events may be correlated with existing fix events in runbooks for existing processes by determining the similarity of the alerts, including, error conditions causing the alert, break events which may occur if the error condition is not addressed, the similarity in the functions performed by the new process and the existing process (e.g., both processes may be online commerce type processes), common interfaces and other enterprise systems access by the existing processes and the new process and any other details which may be provided by the monitoring system generating the alert.

A human operator may be presented with a plurality of identified fix events that may potentially be able to address the air condition. Runbooks document what fix event must be applied based on the alert triggered by the break event. This is why specific alerts are so important to this art. If the alert is not specific enough to identify just one and only one fix event, then a human operator is presented with choices. The identified fix events may be arranged in a ranked order depending on their degree of correlation with the break event generated by the new process and the ability of the fix event to address the error condition. The human operator is then able to select one of the identified fix events for testing to determine if the fix event is able to effectively address the error condition. If the fix event is operative to correct the error condition, it may be added to an existing or new runbook for the new process. If the fix event is ineffective in fixing the error condition, the human operator may select another of the identified fix events for testing. In the event that none of the identified fix events is effective in addressing the error condition, the human operator may supply a fix event in the form of written instructions, a code snippet or script that may be executed or an automated fix that may be automatically run when the alert is received.

As an example, the system developer creates a system implementing an e-commerce shopping cart. The e-commerce shopping cart system may integrate with other enterprise systems including, for example, (1) an inventory database; (2) a programming framework in Java/JavaScript and WordPress; (3) AWS; (4) a credit card payment system; and (5) a logistics/shipping system that can print labels and invoices in paper/stickers/email formats. As such, six systems in all are involved in the e-commerce shopping cart. To ensure the e-commerce shopping cart is working, the developer may create alerts that fire when a customer transaction fails as this event represents a threat to revenue. An additional alert may be created when, for example, inventory runs below a normalized average of the last 60 days of customer purchases. If the alert is specific enough, an automated fix event may be provided for the first alert that occurs when a customer transaction fails. However, to address the second alert, more inventory may need to be ordered and as such, the fix event for this alert may not be able to be automated.

An alert that a transaction fails needs to be specific as to the reason for the failure such that an automated fix event may be implemented. For example, if a transaction fails because the customer's credit card approval fails, there is nothing that can be done to automate a fix. However, if the transaction fails because of the website implementing the e-commerce shopping cart crashes, the failure may be caused by several factors including, for example, spike in AWS traffic, a CPU maxing out and latency on the webpage. When a specific cause is identified by the alert, the fix event may be automated.

At a later time, an alert may fire for the new process. The alert may specify that the CPU is maxing out. A human operator must address this error condition by hand, but in the time it takes for the human operator to react to the alert, the customer transaction may be lost. An automated event can make the same adjustments in a much shorter period of time, such that the customer transaction may not be lost, and, in fact, the customer may never know there was a problem. Once a fix event is identified that addresses the condition where the CPU is maxed out, it can be automatically applied each time the alert fires and may fix the error condition in a fraction of the time it would take a human operator to do the same, such that the customer is unaware of the error.

A large enterprise may have thousands of automated fixes residing in runbooks for hundreds of different enterprise systems. Once a critical mass of automated fix events has been developed, when a new process is on-boarded, there is a high likelihood that an automated fix event exists to address well-defined alerts, such that a new runbook may be created for the new process. Additionally, the new runbook becomes part of the extensive library of automated fixes that may potentially be used by other new processes.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates an example of a system including an implementation of a "runbook as a service" system implemented in a network environment, that is able to automate the creation of runbooks for new processes.

The system 100 may include an enterprise network 107 to which are coupled various system components, such as networked systems 109 and a new process 112 for which a new runbook will be created. Networked systems 109 may include computer processes and/or additional computing system environments that provide or support operations of the enterprise. New process 112 may interface with one or more network systems 109 via enterprise network 107.

The functioning of system 100 may be monitored by the monitoring component 110 via the enterprise network 107 or via direct connection to new process 112. Monitoring component 110 may be configured to generate break events in response to error conditions which arise in the normal functioning of network systems 109 or new process 112. The generated break events may be reported as alerts. Monitoring component 110 may include one or more commercially available computer process monitoring systems or software, such as those provided by Pagerduty, Zabbix, Datadog, Apica systems or the like.

The monitoring component 110 may monitor networks, servers, enterprise cloud performance, application performance, and service performance. For example, the monitoring component 110 may monitor server performance, server availability, and server configuration changes. Aspects of server performance that may be monitored may include high processor or memory usage, packet loss, interface errors, low core router throughput, abnormal normal TCP connections, or network bandwidth usage.

As monitoring component 110 monitors the computer processes, some of the computer processes may begin to degrade or fail. For example, at a certain point as the computer process begins to degrade, a potential operational breakdown of one or more computer-implemented processes may be detected by the monitoring circuit and one or more break events are output indicating a guardrail or threshold, has been exceeded and the process status, state or health goes from "working" to "failing." This definition is some measure of a quantitative metric, like latency or some other term in a service level agreement, for example, that is time or alerts within a timeframe based. This line between "working" and "failing" is a critical time in the performance of the system since most computer processes within the network environment are interdependent on other computer processes within the network environment. When a failure begins, there is an exponential risk that up/downstream systems will begin to fail as well.

Monitoring component 110 may have threshold settings, or guardrails, against which are compared a measurement of a process attribute being monitored, such as an ALERT, which means that the computer process is experiencing a fault but is still working with an acceptable performance level, or FAILING, which means performance is no longer working at an acceptable performance level. In response to a measurement related to a computer process exceeding a guardrail, the monitoring circuit may generate a break event. The break event may be indicative of an ALERT or FAILING performance measurement. As the monitoring circuit continues to monitor the process that caused the initiation of the break event, the monitoring circuit may continue to compare the measurement of the process attribute to see if yet another guardrail is exceeded. Each of the respective guardrails may indicate an increased severity, or urgency, of the computer process's status with respect to potential failure, breakdown or another operational fault.

Returning to the example of FIG. 1, each of the one more computer processing monitoring software or systems of the monitoring component 110 may output an alert cause by a break event indicating a symptom of a potential operational breakdown of one or more computer-implemented processes that are being monitored. A break event may be a flag or other data string output by the respective computer process monitoring software or system.

The monitoring component 110 may be coupled to a runbook as a service system 102 which develops and provides runbooks to new processes. The optimality apparatus 120 may be coupled to an enterprise escalation service 130, a database 128, and an action service 140.

The enterprise escalation service 130 may be called when human intervention is required to decide how to proceed with remediating a process fault. That is, the enterprise escalation service 130 may be called when a runbook for a process has no fix event associated with the particular break event or when the fix event associated with a break event is not automated and requires human intervention. The action service 140 may be called based when an automated correction in a runbook for the process generating the break event is available and human intervention is unnecessary.

Runbook creator 102 may include alert monitoring component 122, correlation component 124 and runbook composer 126. Correlation component 124 and runbook composer 126 may both access data storage 128 which contains a runbook library 127 of all runbooks 126-1 . . . 126-$n$ currently existing within the enterprise, for example, those associated with network systems 109. Runbook composer 126 requires access to data storage 128 such as to store a new runbook generated for new process 112 within runbook library 127.

It should be noted that, although FIG. 1 is explained within the context of a system for generating a new runbook for new processes, it would be realized by one of skill in the art that runbook creator 102 may also be configured such as to update existing runbooks for new processes or existing networked systems 109.

Alert monitoring component 122 receives alerts from monitoring component 110 for new process 112 and checks runbook library 127 to see if a runbook exists for new process 112. If a runbook does currently exist in runbook library 127 for new process 112, it is determined if the particular break event that cause the alert received from monitoring component 110 already has an entry in the runbook. If no runbook currently exists in runbook library 127, or a runbook does exist but does not have an entry for the particular break event received from monitoring component 110, alert monitoring component may pass the alert received from monitoring component 110 to correlation component 124. If a runbook exists, and the break event that caused the received alert already exists in the runbook, the fix event, if automated, may be automatically implemented by action service 140.

Correlation component 124 may seek to find break events that are highly correlated to the received break event in existing runbooks 126-1 . . . 126-n. In practice, correlation component 124 may select particular runbooks 126 in runbook library 127 from which to draw correlated alerts. Alternatively, correlation component 124 may check all runbooks 126 in runbook library 127 to determine if there are already-existing highly-correlated break events. The degree of correlation between a received break event and a break event already existing in one or more runbooks 126 may be determined by several factors, including, for example, the similarity between new process 112 and a process associated with a particular runbook 126, similarities could be determined as functions performed by the processes or common systems that the processes interface with. In addition, having matching or similar information in the received alert and in alerts currently stored in runbooks 126 will indicate a degree of correlation between the received break event and break events existing in runbooks 126. Correlation component may reach retrieve one or more highly-correlated break events from existing runbooks 126.

Break events in the existing runbooks 126 will each have an associated fix event.

Runbook composer 126 may take fix events from highly-correlated break events determined by correlation component 124 and present them to a human operator. Fix events may be evaluated for the likelihood that they will be able to fix the error condition that caused the break event to be generated. The highly-correlated break events may have fix events associated therewith that, when executed, will address the error condition which caused the alert. The fix events may be presented to the human operator in an order determined by the degree of correlation between the break event associated with the fix event and the received break event, with the fix events associated with more highly-correlated break events displayed more prominently, or at the top of the list of fix events presented to the human operator. Note that, the alerts generated by the break event must be specific. This condition only applies if multiple fix event candidates are presented. 99% of the time, there will only be one fix event specified.

The human operator may choose a fix event from the list of fix events to determine if the particular fix event is effective in addressing the error condition which caused the received alert. If the selected fix event adequately addresses the error condition which caused the break event to be generated, the break event, the fix event, the associated alert, and any other information may be added to a new or existing runbook for new process 112. If the selected fix event does not adequately address the error condition which caused the break event to be generated, the human operator may select another fix event from the list until a fix event is discovered that addresses the error condition. Preferably, the fix event will be an automated fix, however, in the event that no automated fix exists to address the error condition, the fix event may comprise literal instructions which require human intervention.

Figure 2:
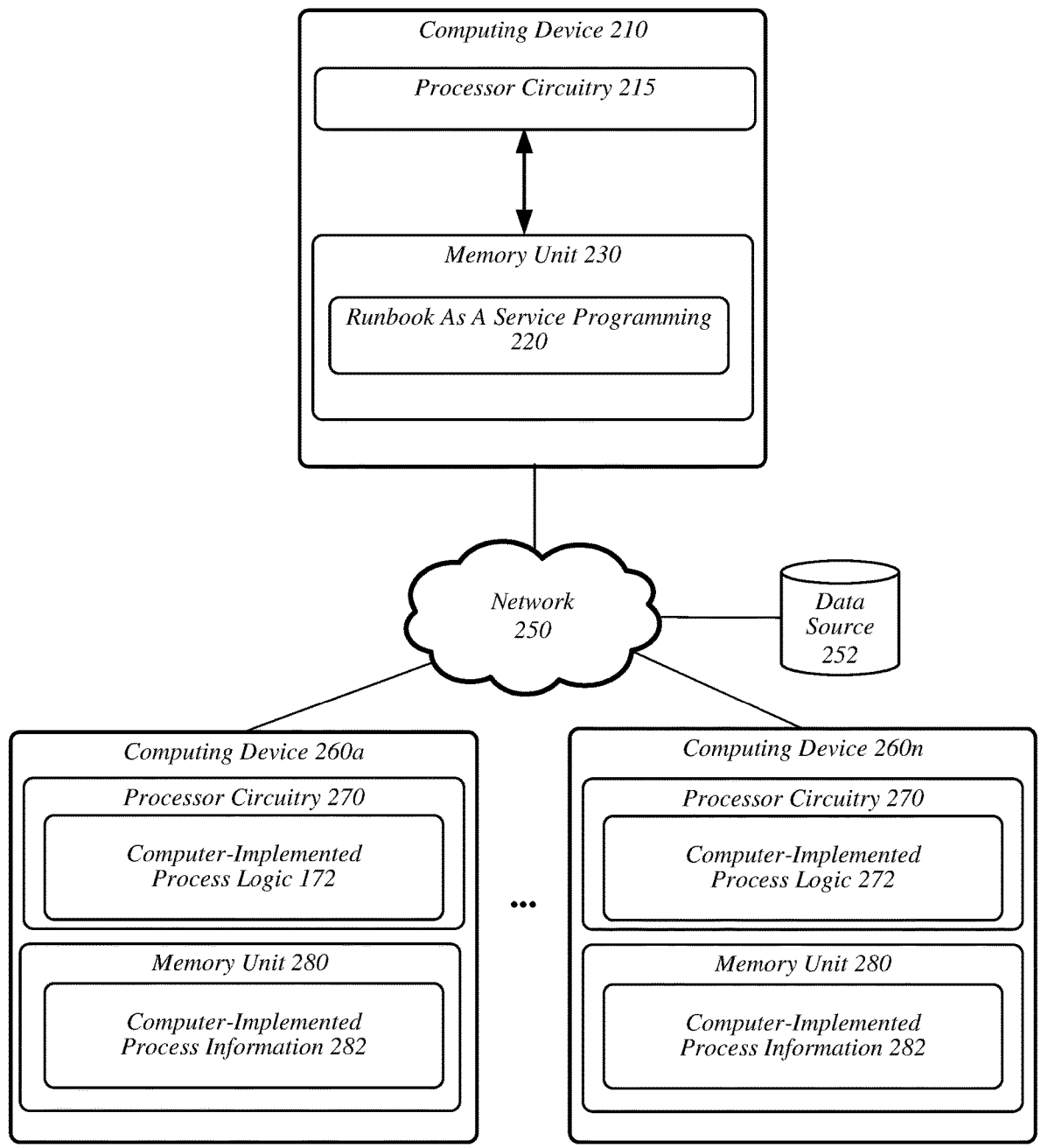
FIG. 2 is a block diagram of exemplary computing devices suitable for executing the methods of the present invention.

FIG. 2 includes block diagrams of system and hardware components for executing the runbook as a service system 100 from FIG. 1. The runbook as a service system 100 may be implemented on computing device 210 which includes a processor circuit 215 for executing runbook as a service programming 220 which implements the runbook as a service system 100 from FIG. 1. Processor circuitry 215 may include one or more processing devices, such as microprocessors manufactured by Intel™, AMD™, or any of various commercially-available processors.

Memory unit 230 may include one or more memory (volatile or non-volatile) devices configured to store runbook as a service programming 220. Runbook as a service programming 220 may be loaded from one type of memory to another type of memory for execution by processor circuitry 215. For example, runbook as a service programming 220 may be loaded from a non-volatile storage device, for example, a non-transitory computer-readable medium to volatile memory, to a volatile memory, for example, random-access memory such as it may be executed by processor circuitry 215.

Computing devices 260a . . . 260n may be used in a similar manner to computing device 210 to execute networked systems 109 or new process 112. Computing devices 210, 260 may communicate via network 250. For example, a computer implemented process running on computing device 260a may require services provided by a computer-implemented process running on computing device 260b. In such cases, the systems may communicate over network 250. Likewise, monitoring component 110 may be implemented on one of computing devices 260. It should be realized that computing devices 260 may serve the role of either a server or client within network 250. Network 250 may further include one or more data sources 252 for use by computer-implemented processes running on computing devices 260.

The runbook as a server system 100 may couple to a data storage 128, which may be implemented as data storage 252, on which runbook library 127 is stored. The data storage 128 may include hard disk drives, flash memory devices, optical storage devices, floppy storage devices, and the like. In some instances, the data storage 128 may include cloud-based storage devices that may be accessed via the network 250. In some examples, the data storage 128 may be configured to store one or more databases and/or act as a distributed database system to store information and data. The runbook library 127 may include several different runbooks 126-1 . . . 126n specific to one or more of network systems 109. Each of the networked systems 109 may have a runbook for the respective computer processes within each respective system. Each runbook 126-1 . . . 126n in the runbook library 127 is a list of procedures for implementing possible corrective actions to the one or more computer-implemented processes.

Figure 3:
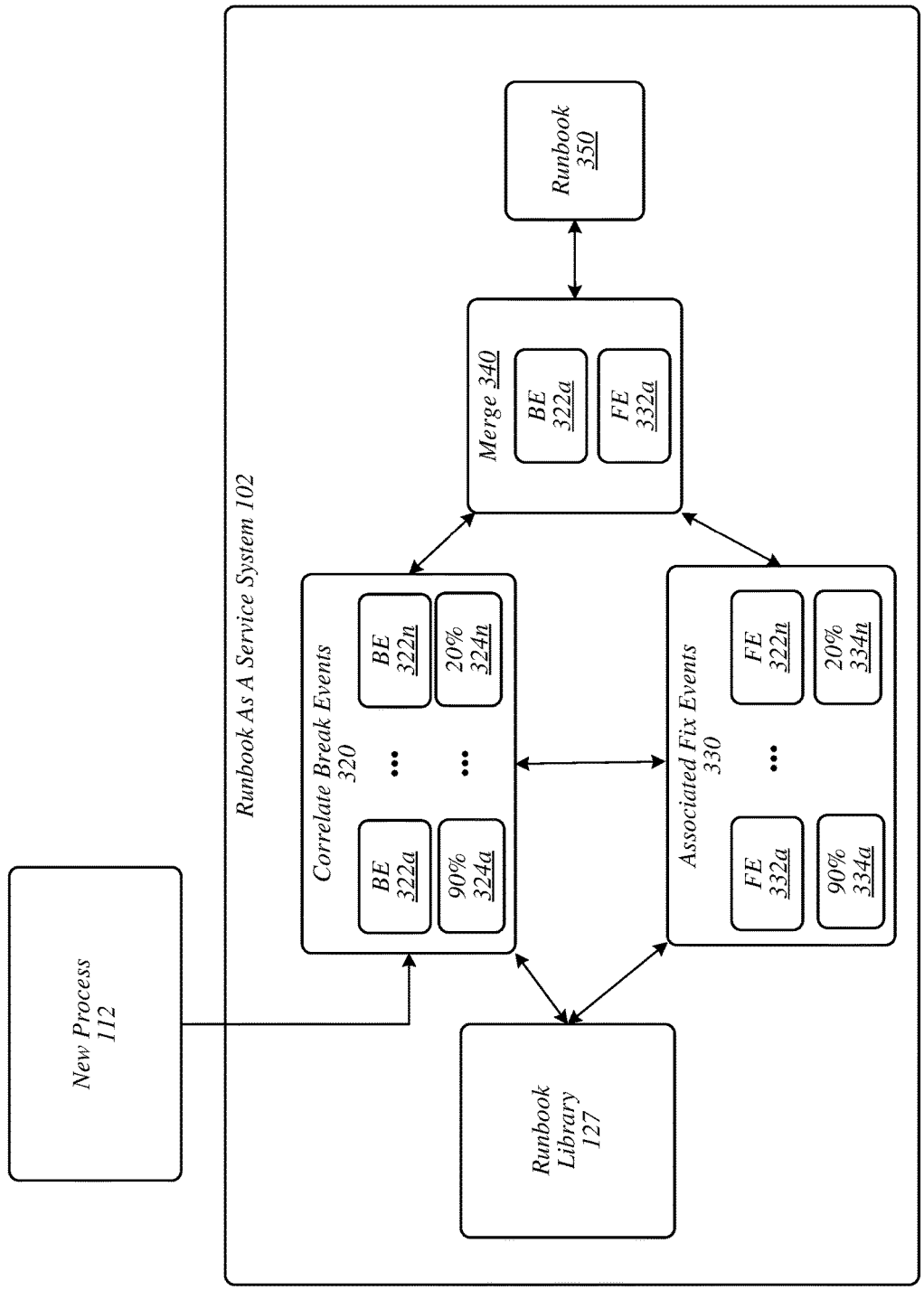
FIG. 3 is a block diagram of a process for creating a runbook for a new process by correlating a break event to a fix event and inserting them into a runbook for a new process.

FIG. 3 is a block diagram illustrating the process described above. New process 112 may generate a break event. The break events may be correlated, at 320, with multiple other break events obtained from runbook library 127. Each break event 322 will be associated with a probability 324 indicating the degree of correlation between the received break event and the break event found in runbook library 127. The break events 322a . . . 322n may be ranked in an order in accordance with their degree of correlation 324a . . . 324n with the received break event. In addition, if more than one fix event is identified, fix events 330 may also be ranked in accordance with the likelihood 334a . . . 334n that they are able to fix the error condition which caused the received break event. Once a human operator has selected a fix event 332a and verifies that it works to address the error condition which caused the break event, the fix event 332a and break event 322a are merged at 340 and placed in new runbook 350 for new process 112.

Figure 4:
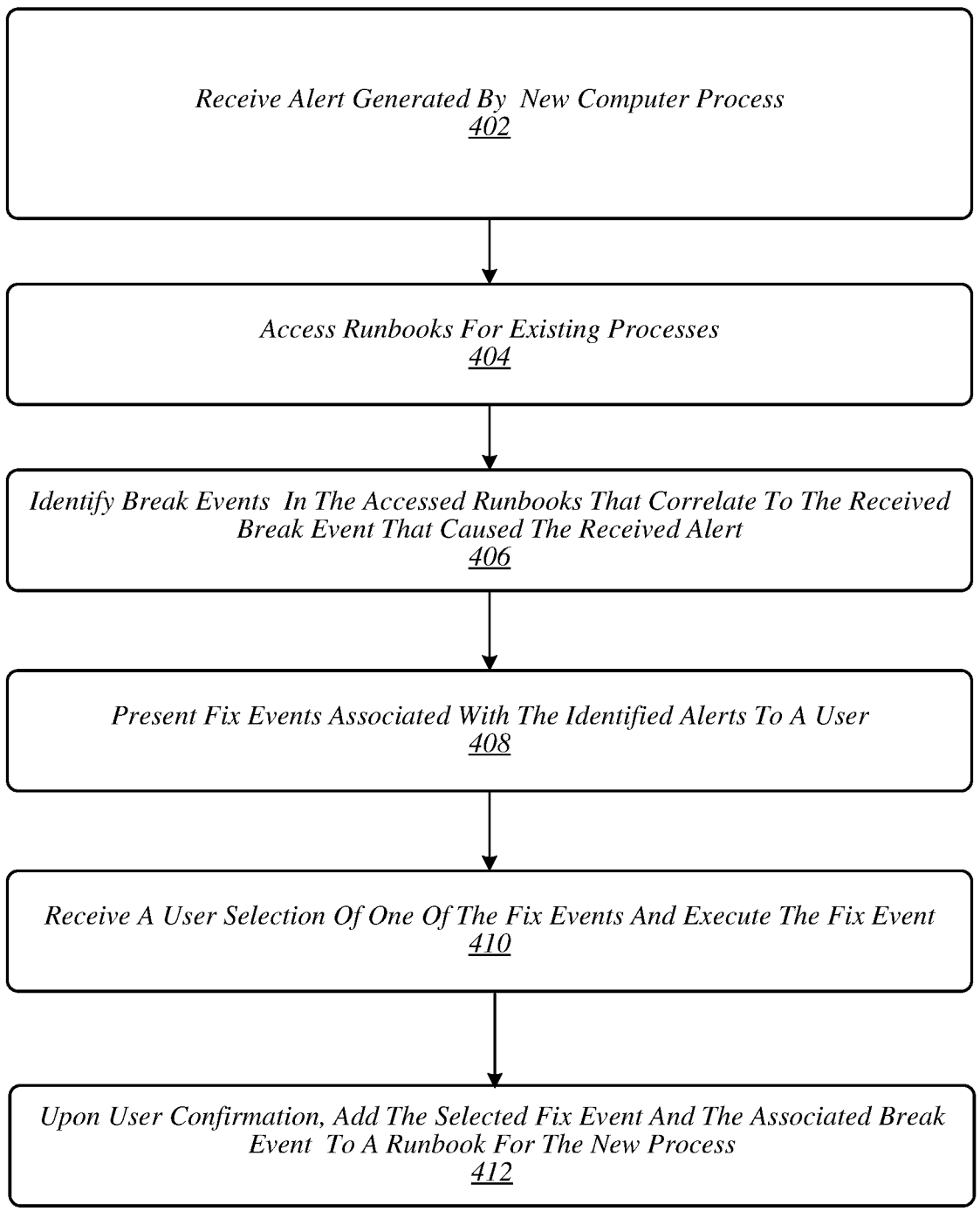
FIG. 4 illustrates a process flow for creating a new runbook or adding to an existing runbook for a new process by using fix events from existing runbooks for different processes.

A process flow for one embodiment of the invention is shown in FIG. 4. In this embodiment, the system is successful in finding a fix event associated with a highly-correlated break event that fixes the error condition which caused the break event to be generated. At 402, an alert is received by alert monitoring component 122 from monitoring component 110 which has generated a break event related to computer process 112. Alert monitoring component 122 may determine that either no runbook exists for new process 112 for that a runbook does exist for new process 112 but does not contain the generated break event. At 404, correlation component 124 will access one or more runbooks 126a . . . 126n stored in runbook library 127 on data storage 128. At 406, correlation component 124 identifies break events in runbooks 126-1 . . . 126-n having a high degree of correlation with the break event reported in the received alert. At 408, one or more fix events associated with the highly-correlated break events may be presented to a human operator. Preferably, the fix events will be automated or automatable. At 410, the user selection of one of the fix events is received from the human operator and the fix event is executed, if automated. At 412, the human operator may indicate that the fix event has successfully addressed the break event which caused the received alert and, as a result, the selected fix event and the associated break event are added to a new runbook 350 for the new process 112.

Figure 5:
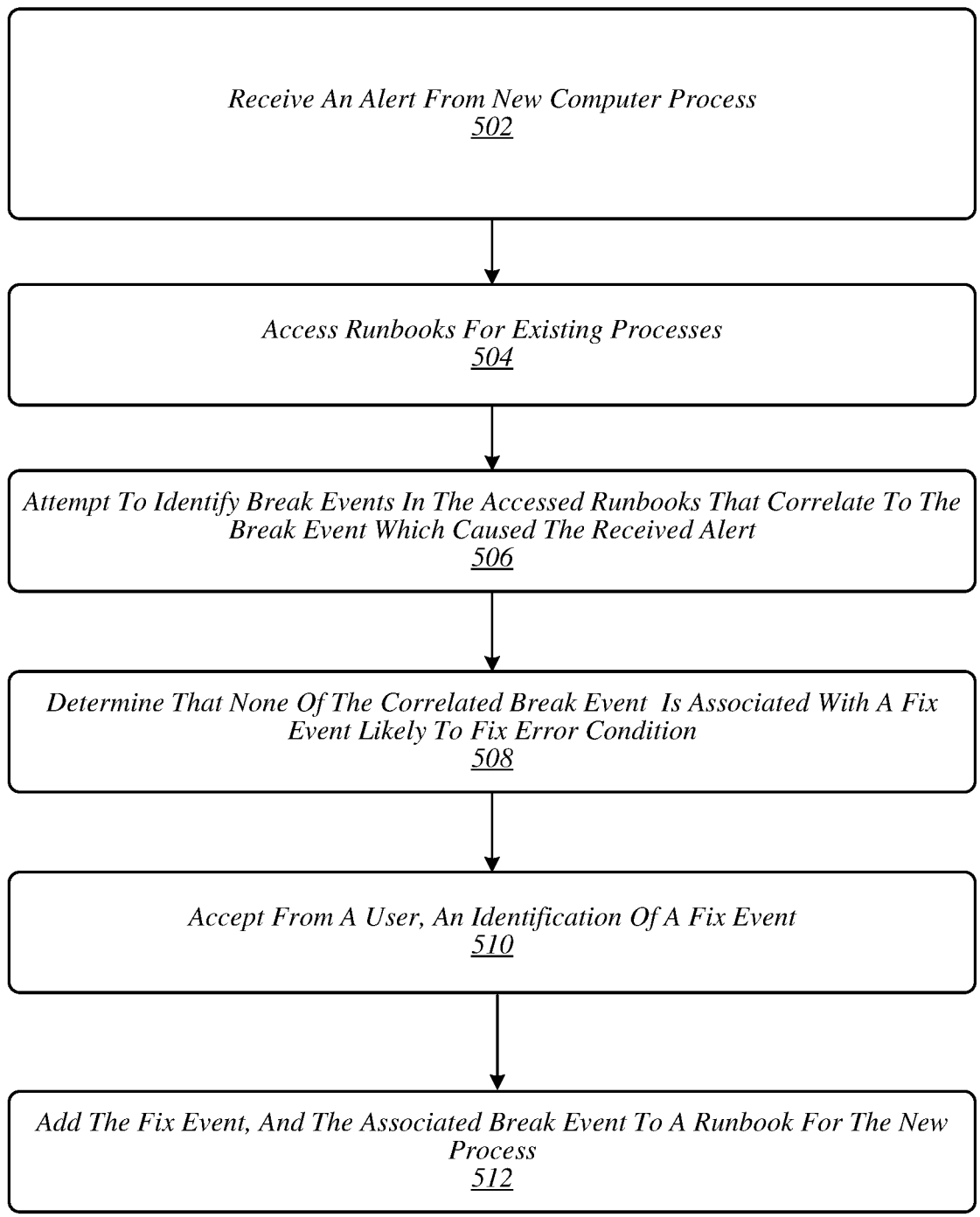
FIG. 5 illustrates a process flow for creating a new runbook or adding to an existing runbook for a new process by using a new fix event.

A process flow for a second embodiment of the invention is shown in FIG. 5. In this embodiment, the system is unable to find a fix event existing in runbook library 127 that addresses the error condition which caused the break event to be generated. The process is similar to that shown in FIG. 4. At 502, an alert is received by alert monitoring component 122 from monitoring component 110 which has generated a break event related to computer process 112. Alert monitoring component 122 may determine that either no runbook exists for new process 112 for that a runbook does exist for new process 112 but does not contain the received alert. At 504, correlation component 124 accesses one or more runbooks 126a . . . 126n stored in runbook library 127 on data storage 128. At 506, the process attempts to identify break events in the accessed runbooks having a high degree of correlation to the break event which caused the received alert. At 508, it is determined that none of the correlated break events is associated with a fix event that is likely to correct the error which caused the break event. At 510, a fix event may be identified by the human operator. The fix event may be, for example, literal instructions, a code snippet or script, or an automated fix event newly-created by the human operator. At 512 the fix event and the associated break event, which had been merged together at 340, are added to a runbook 350 for the new process 112.

At FIG. 6, process flow for a third embodiment of the invention is shown. In this embodiment, when the alert has been received by monitoring component 110 from new process 112 and alert monitoring component 122 determines that a runbook exists in runbook library 127 associated with new process 112. It is further determined that the runbook associated with new process 112 has a fix event associated with received break event and that the fix event is automated. In such a case, the automated fix event is executed by action service 140 which implements the fix. At 602, an alert is received by alert monitoring component 122 from monitoring component 110 as a result of monitoring component 110 detecting a break event caused by an error condition in new process 112. At 604 alert monitoring component accesses the runbook for new process 112 from runbook library 127 and at 606, it is determined that the runbook contains an automated fix event for the break event which caused the alert. At 608, the automated fix event is executed by action service 140 to correct the error condition which caused the break event.

Figure 7:
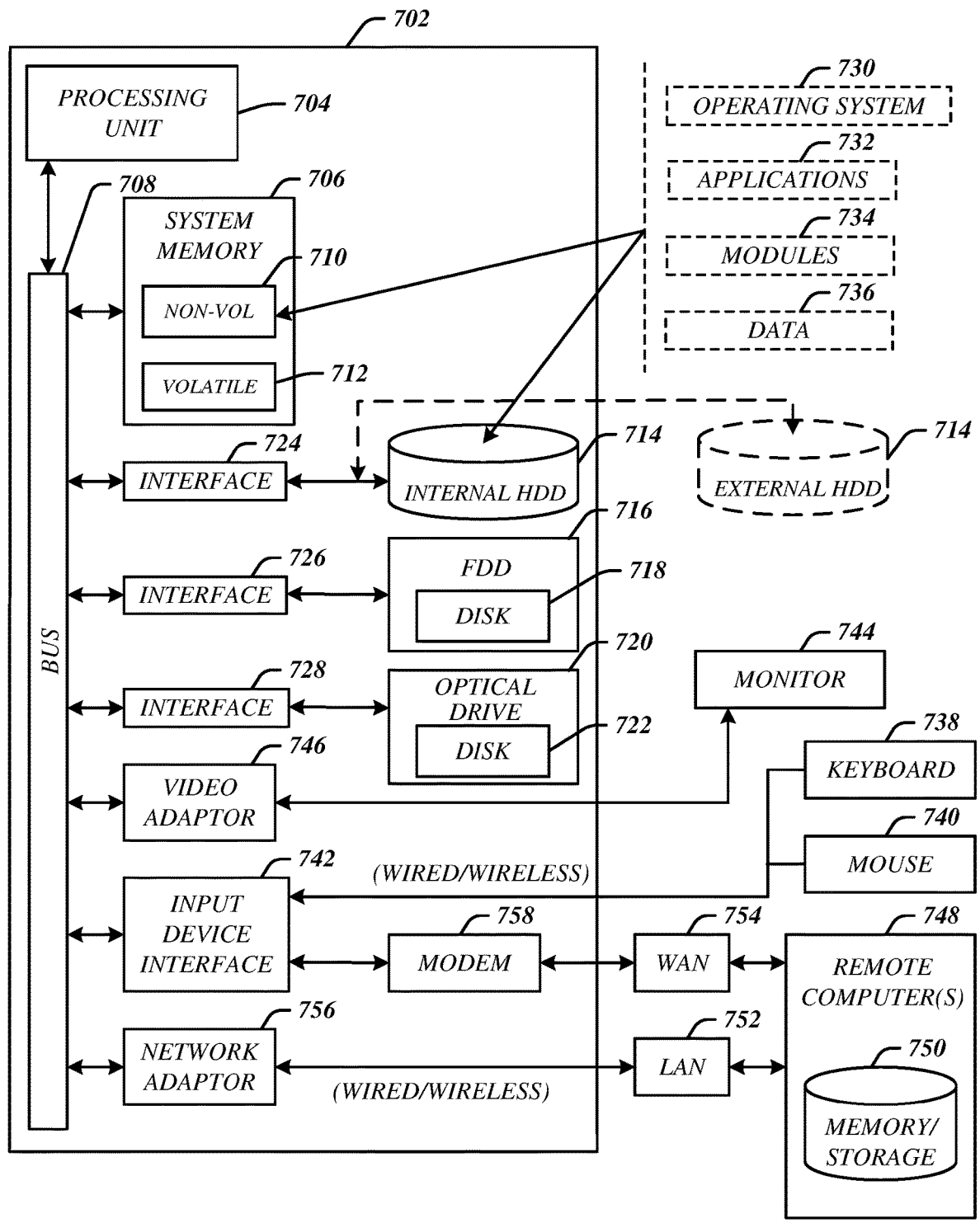
FIG. 7 illustrates an exemplar of an embodiment of a computing architecture suitable for implementing the systems described in FIGS. 1-3.

FIG. 7 illustrates an embodiment of an exemplary computing architecture 700 suitable for implementing various embodiments as previously described. In one example, the computing architecture 700 may include or be implemented as part of runbook as a service system 100. In another example, the computer architecture 700 includes components of an automated system for addressing break events.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server or a processor and the server or the processor can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes a processing unit 704, a system memory 706 and a system bus 708. The processing unit 704 can be any of various commercially available processors. The runbook as a server system 100 of FIG. 1 may incorporate one or more of the components of the computer architecture 700, such as the processing unit 704, the system memory 706 and so on. Other components, such as the keyboard 738 and the mouse 740, may be omitted in some examples.

The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a non-transient computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714 or 714A, and an optical disk drive 720 to read from or write to a removable optical disk 722 (e.g., a CD-ROM or DVD). The HDD 714 and optical disk drive 720 can be connected to the system bus 708 by an HDD interface 724 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 700.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 704 through an input device interface 742 that is coupled to the system bus 708 but can be connected by other interfaces such as a parallel port, IEEE 1394 serial port, a game port, a USB port, an IR interface, and so forth.

A monitor 744 or another type of display device is also connected to the system bus 408 via an interface, such as a video adaptor 746. The monitor 744 may be internal or external to the computer 702. In addition to monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies and facilitate enterprise-wide computer networks, such as intranets, all of which may connect to a global communications network, for example, the Internet.

When used in a LAN networking environment, the computer 702 is connected to the LAN 752 through a wire and/or wireless communication interface 756. The communication interface 756 can facilitate wire and/or wireless communications to the LAN 752, which may also include a wireless access point disposed thereon for communicating with the wireless functionality of the communication interface 756.

When used in a WAN networking environment, the computer 702 can include a modem 758 754, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices, apparatuses or systems as previously described with reference to FIGS. 1-2 may include various hardware elements, software elements, or a combination of both. Examples of hardware elements may include structural members, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

However, whether an embodiment is implemented using hardware elements, cloud elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

What is claimed is:

1. A system, comprising:
a non-transitory, computer-readable medium; and
instructions stored on the medium, that, when executed by a processor, cause the system to:
receive an alert from a new computer-implemented process not having an associated runbook, the alert associated with a break event;
access one or more runbooks of one or more existing computer-implemented processes, each runbook comprising one or more associated alerts, break events, and fix events;
automatically identify, for the alert, one or more correlated alerts from the one or more runbooks from the existing computer-implemented processes, wherein each of the one or more correlated alerts is associated with the one or more exiting computer-implemented processes comprising a first set of functions matching a second set of functions of the new computer-implemented process associated with the alert;
present, to a user, one or more fix events associated with the one or more correlated alerts;
receive, from the user, a selection of one of the one or more fix events; and
copy the alert, the associated break event and the selected fix event from an existing runbook to a new runbook associated with the new computer-implemented process.

2. The system of claim 1 wherein at least one of the one or more fix events presented to the user are automated fix events.

3. The system of claim 1 wherein the selected fix event is a code snippet that, when executed, addresses the break event.

4. The system of claim 3, the instructions further configured to cause the system to:
configure the new runbook to automatically implement the fix event when the alert is received.

5. The system of claim 3, the instruction further configured to cause the system to:
present, to the user, a user control to confirm the execution of the automated fix event;
receive a user selection of the user control as a prerequisite to executing the fix event.

6. The system of claim 3, the instructions further configured to cause the system to:
present, to the user, the code snippet;
accept edits to the code snippet from the user; and
save the edited code snippet as the fix event associated with the alert.

7. The system of claim 1, the alert identifying a break event, a cause of the break event and the severity of the effect of the break event.

8. The system of claim 7, the instructions further configured to cause the system to receive one or more additional alerts, wherein the additional alerts are correlated to the one or more alerts from the one or more runbooks based on similarities between the break event, the cause and the severity.

9. The system of claim 1, the instructions further configured to cause the system to:
allow the user to execute one or more of the presented fix events before accepting a user selection of one of the presented fix events.

10. The system of claim 1 wherein the one or more correlated alerts from the one or more runbooks are identified by further instructions configured to cause the system to:
determine an alert correlation score for each of the alerts in the one or more runbooks indicating a similarity of each alert to the alert.

11. The system of claim 1, the instructions further configured to cause the system to:
determine a fix event correlation score for fix events associated one or more of the correlated alerts indicating a likelihood that each fix event will correct the break event.

12. The system of claim 11, the instructions further configured to cause the system to:
present the one or more fix events to the user in an order determined by their respective fix event correlation score.

13. A system, comprising:

a processor;

a non-transitory, computer-readable storage medium; and instructions stored on the medium, that, when executed by the processor, cause the system to:

receive an alert from a new computer-implemented process not having an associated runbook, the alert associated with a break event;

access one or more runbooks of one or more existing computer-implemented processes, each runbook comprising one or more associated alerts, break events and fix events;

automatically identify, for the alert, one or more correlated alerts from the one or more runbooks from the existing computer-implemented processes, wherein each of the one or more correlated alerts is associated with the one or more exiting computing-implemented processes comprising a first set of functions matching a second set of functions of the new computer-implemented process associated with the alert;

determine that none of the correlated alerts are associated with an automated fix event;

accept an identification of a fix event for the received alert; and copy the alert, the associated break event and the fix event represented by a code snippet from an existing runbook to a new runbook associated with the new computer-implemented process.

14. The system of claim 13, the fix event representing an automated fix event.

15. The system of claim 14, the instructions further configured to cause the system to:

configure the new runbook to automatically implement the fix event when the alert is received.

16. The system of claim 15, the instructions further configured to cause the system to:

present, to the user, the code snippet;

accept edits to the code snippet from the user; and save the edited code snippet as the fix event associated with the received alert.

17. A computer-implemented method executed by a processor comprising:

receiving an alert from a computer-implemented process, the alert associated with a break event;

accessing a runbook associated with an existing computer-implemented process;

automatically identify, for the alert, a correlated alert from the runbook from the existing computer-implemented process, wherein the correlated alert is associated with the exiting computing-implemented process comprising a first set of functions matching a second set of functions of the computer-implemented process associated with the alert;

determining that the runbook comprises an automated fix event associated with the correlated alert; and triggering the automated fix event for the alert.

18. The method of claim 17, the fix event comprising an executable code snippet, wherein triggering the automated fix event comprises executing the code snippet.

19. The method of claim 18, further comprising:

presenting, to a user, a user control to confirm the execution of the automated fix event;

receiving a user selection of the user control as a prerequisite to implementing the automated fix event.

* * * * *